(12) United States Patent
Wei

(10) Patent No.: US 6,877,915 B1
(45) Date of Patent: Apr. 12, 2005

(54) TRIPOD

(75) Inventor: David Wei, Taipei (TW)

(73) Assignee: E-Benk Tech Co., Ltd., Junghe (TW)

( * ) Notice: Subject to any disclaimer, the term of this patent is extended or adjusted under 35 U.S.C. 154(b) by 0 days.

(21) Appl. No.: 10/765,012

(22) Filed: Jan. 26, 2004

(51) Int. Cl.[7] ............................................. G03B 17/02
(52) U.S. Cl. ........................ 396/427; 348/143; 348/373
(58) Field of Search .......................... 396/427; 348/143, 348/158, 373

(56) References Cited

U.S. PATENT DOCUMENTS

| | | | | |
|---|---|---|---|---|
| 4,922,275 A | * | 5/1990 | Hughes | 396/427 |
| 5,289,091 A | * | 2/1994 | Wada | 396/427 |
| 5,850,579 A | * | 12/1998 | Melby et al. | 396/427 |

* cited by examiner

*Primary Examiner*—David M. Gray
(74) *Attorney, Agent, or Firm*—Chao-Chang David Pai; Law Offices of David Pai

(57) ABSTRACT

A tripod includes a supporting base for positioning, a rotary camera platform assembly fastened pivotally with the supporting base, a driving mechanism adapted to rotate the camera platform assembly alternatively forwards and backwards on the supporting base, and a control mechanism adapted to control rotation of the camera platform assembly within a predetermined range of angles, the control mechanism including a graduation dial for rotary motion with the camera platform assembly, two micro switches, a trigger rod mounted in the supporting base between the micro switches and adapted to trigger the micro switches alternatively during operation of the driving mechanism for enabling the driving mechanism to be alternatively controlled by the micro switches to rotate the camera platform assembly forwards and backwards.

4 Claims, 4 Drawing Sheets under a non-working condition; when the graduation dial 4 is rotated with the camera platform assembly 2, the trigger rod 5 may be forced by the first stop rod 41 or the second stop rod 42 to trigger the first micro switch 6 or the second micro switch 7, causing the step motor 3 to be rotated in the reversed direction.

TRIPOD

BACKGROUND OF THE INVENTION

1. Field of the Invention

The present invention relates to a tripod and, more particularly, to such a tripod, which can be controlled to automatically rotate the camera platform assembly with the carried video camera alternatively forwards and backwards within a predetermined range of angles.

2. Description of the Related Art

A camera or photographing device may be supported on a tripod when taking photographs. A conventional tripod enables the loaded camera to be adjusted to the desired angle and elevation. However, conventional tripods do not have means to automatically alternatively rotate the loaded camera forwards and backwards within a predetermined range of angles, i.e. conventional tripods are not practical for use with a video camera for the purpose of monitoring a specific place.

BRIEF SUMMARY OF THE INVENTION

The present invention has been accomplished under the circumstances in view. It is the main object of the present invention to provide a tripod, which can be controlled to automatically rotate the camera platform assembly with the carried video camera alternatively forwards and backwards within a predetermined range of angles.

To achieve this and other objects of the present invention, the tripod comprises a supporting base for positioning, a rotary camera platform assembly fastened pivotally with the supporting base, a driving mechanism adapted to rotate the camera platform assembly alternatively forwards and backwards on the supporting base, and a control mechanism adapted to control rotation of the camera platform assembly within a predetermined range of angles. The control mechanism comprises a graduation dial disposed at a bottom side of the camera platform assembly above the supporting base for rotary motion with the camera platform assembly relative to the supporting base, a first micro switch adapted to control the driving mechanism to rotate the camera platform assembly forwards when triggered, a second micro switch adapted to control the driving mechanism to rotate the camera platform assembly backwards when triggered, a trigger rod mounted in the supporting base between the first micro switch and the second micro switch and adapted to trigger the second micro switch during forward rotation of the graduation dial with the camera platform assembly and the first micro switch during backward rotation of the graduation dial with the camera platform assembly, and a circuit module electrically connected to the first micro switch and the second micro switch and adapted to control the driving mechanism to rotate the camera platform assembly on the supporting base forwards and backwards according to the triggering status of the first micro switch and the second micro switch.

DETAILED DESCRIPTION OF THE PREFERRED EMBODIMENT

Figure 1:
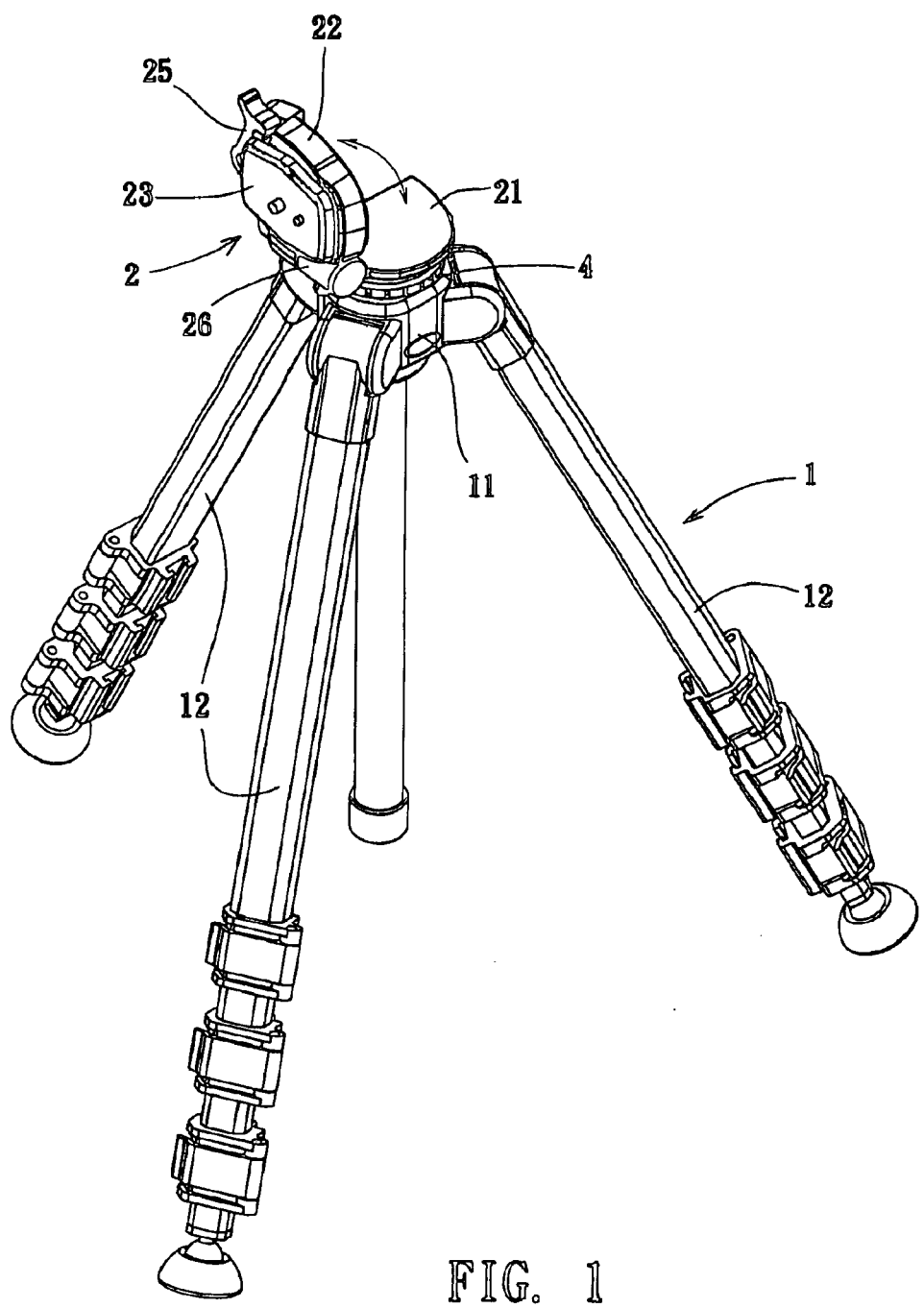
FIG. 1 is a perspective view of a tripod according to the present invention.
Figure 2:
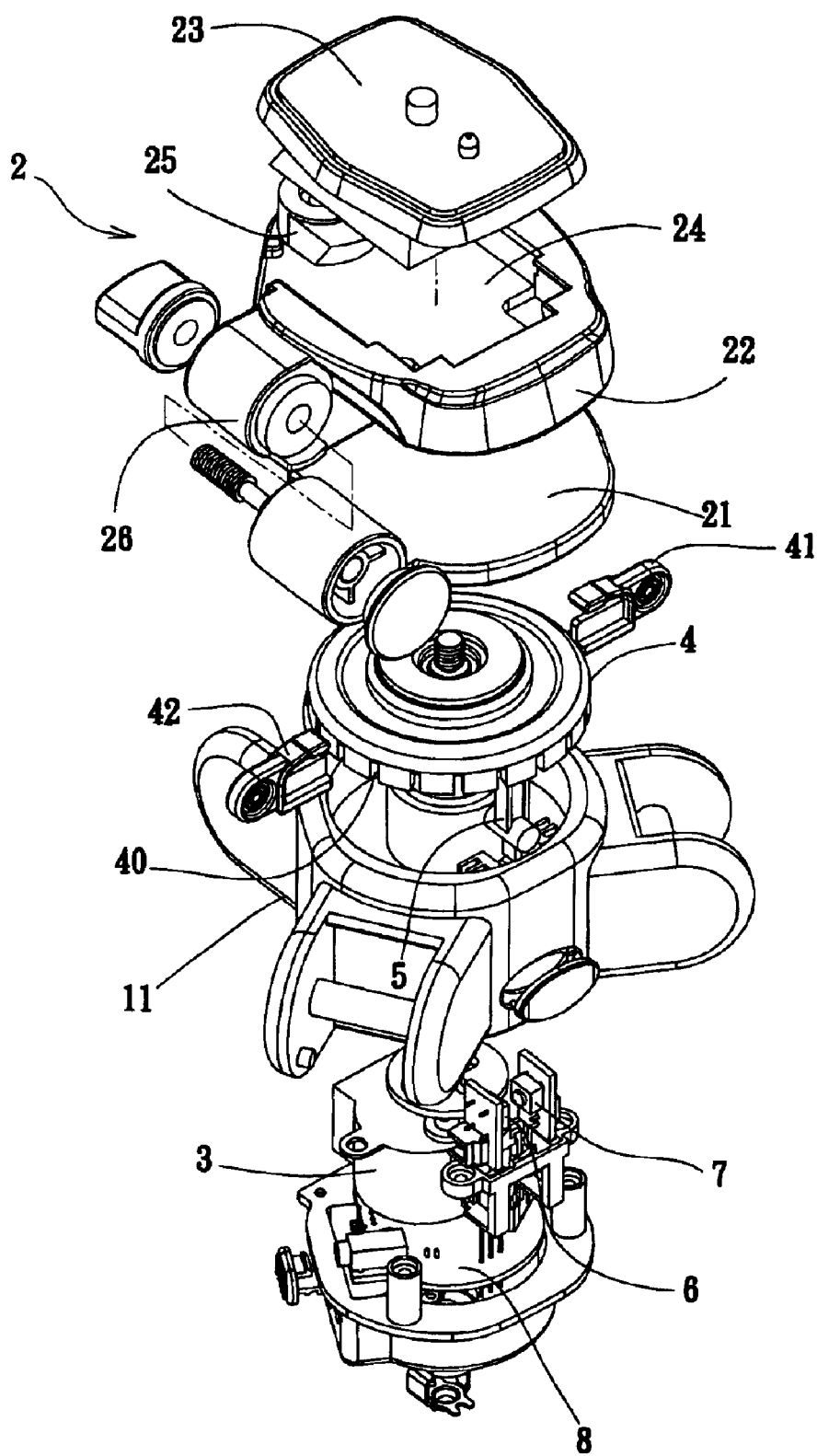
FIG. 2 is an exploded view in an enlarged scale of a part of the tripod shown in FIG. 1.

Referring to FIGS. 1 and 2, a tripod in accordance with the present invention is shown comprising a supporting base 1, a camera platform assembly 2 fastened pivotally with the supporting base 1, a driving mechanism adapted to rotate the camera platform assembly 2 alternatively in reversed directions, and a control mechanism adapted to control rotation of the camera platform assembly 2 on the supporting base 1 within a predetermined range of angles.

The supporting base 1 comprises a head 11, and three retractable legs 12 respectively and equiangularly hinged to the head 11 and adapted to support the tripod on the ground or a floor surface.

The camera platform assembly 2 comprises a lower holder plate 21, an upper holder plate 22 hinged to the lower holder plate 21, and a camera platform 23. The upper holder plate 22 comprises a recessed top coupling hole 24, and a camera platform lock bar 25. The user can pull the camera platform lock bar 25 between two positions, namely, the locking position and the unlocking position. The cameral platform lock bar 25 is moved to the unlocking position, and then the camera platform 23 is fitted into the recessed top coupling hole 24, and then the camera platform lock bar 25 is moved to the locking position to lock the camera platform 23 to the recessed top coupling hole 24 of the upper holder plate 22. Further, a lock 26 is provided between the upper holder plate 22 and the lower holder plate 21, and adapted to lock the upper holder plate 22 and the lower holder plate 21. When the lock 26 is unlocked, the camera platform 23 can be turned with the upper holder plate 22 relative to the lower holder plate 21 between the horizontal position and the vertical position. After adjustment of the camera platform 23 to the horizontal (or vertical) position, the upper holder plate 22 is locked to the lower holder plate 21 with the lock 26.

The aforesaid driving mechanism comprises a step motor 3 mounted in the head 11 of the supporting base 1.

The aforesaid control mechanism comprises a graduation dial 4 disposed at the bottom side of the camera platform assembly 2 above the head 11 of the supporting base 1 for rotary motion with the camera platform assembly 2, a trigger rod 5 mounted in the head 11 of the supporting base 1, a first micro switch 6 and a second micro switch 7 disposed at two sides of the trigger rod 5, and a circuit module 8 electrically connected to the first micro switch 6 and the second micro switch 7 and adapted to control the operation of the step motor 3.

Figure 3:
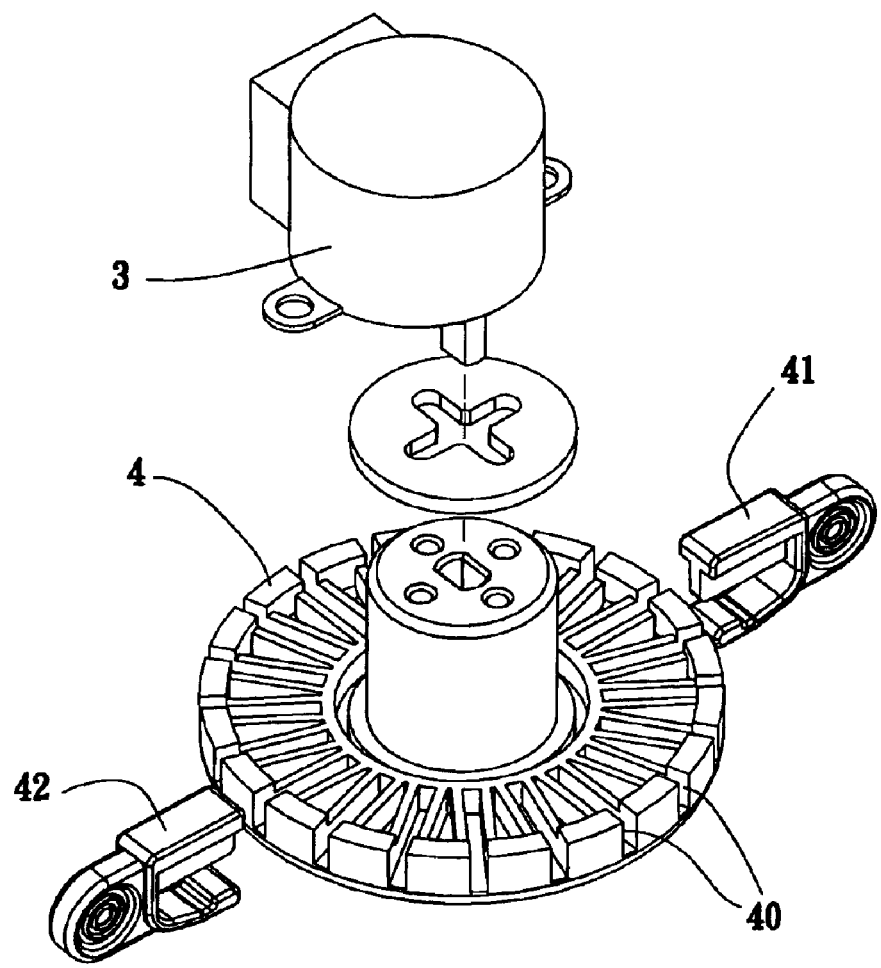
FIG. 3 is an exploded view in an enlarged scale of the step motor and the graduation dial of the tripod shown in FIG. 1.
Figure 4:
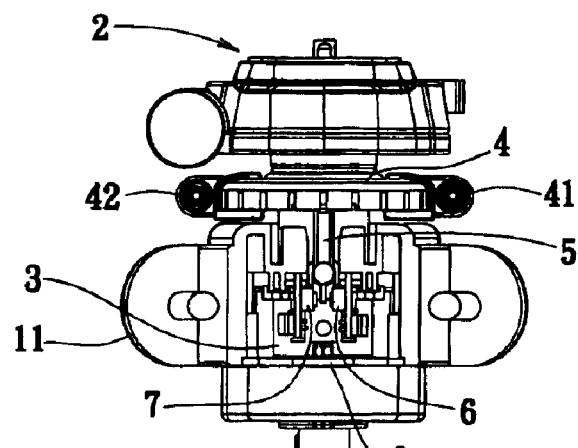
FIG. 4 is a schematic drawing showing the action of the camera platform assembly according to the present invention.

Referring to FIGS. 3 and 4 and FIGS. 1 and 2 again, the graduation dial 4 comprises 24 radial slots 40 equiangularly spaced around the periphery, a first stop rod 41, and a second stop rod 42. The first stop rod 41 and the second stop rod 42 are selectively inserted into the radial slots 40, i.e., the user can determine the contained angle between the first stop rod 41 and the second stop rod 42. Further, the trigger rod 5 is disposed between the first stop rod 41 and the second stop rod 42 in the path of the first stop rod 41 and the second stop rod 42 (see FIG. 4).

Figure 5:
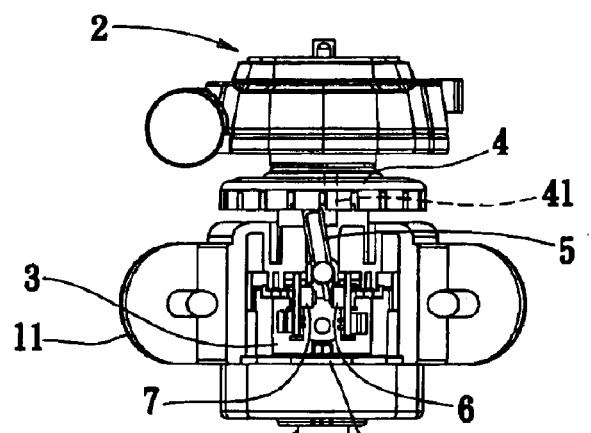
FIG. 5 is a schematic drawing showing the camera platform assembly switching from backward to forward rotation according to the present invention.
Figure 6:
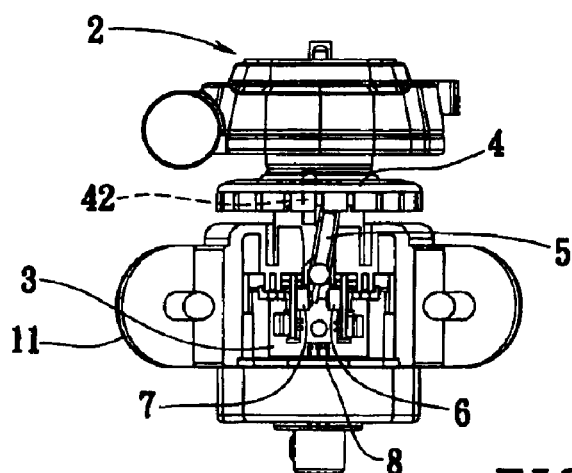
FIG. 6 is a schematic drawing showing the camera platform assembly switching from forward to backward rotation according to the present invention.

Referring to FIGS. 5 and 6, when starting the step motor 3 to rotate the graduation dial 4, the first stop rod 41 is moved with the graduation dial 4 to touch the trigger rod 5 (see FIG. 5). At this time, the trigger rod 5 is biased to trigger the first micro switch 6, thereby causing the circuit module 8 to give a control signal to the step motor 3 to reverse the direction of rotation of the step motor 3, and therefore the graduation dial 4 is reversed. During reverse rotation of the graduation dial 4, the second stop rod 42 will be moved to trigger the trigger rod 5 (see FIG. 6), thereby causing the trigger rod 5 to trigger the second micro switch 7. Upon triggering of the second micro switch 7, the circuit module 8 gives a control signal to the step motor 3 to reverse the direction of rotation of the step motor 3 again. Therefore, the graduation dial 4 is alternatively rotated forwards and backwards within the angles set by the first stop rod 41 and the second stop rod 42, i.e., the video camera or the like carried on the camera platform assembly 2 is alternatively rotated forwards and backwards with the camera platform assembly 2 and the graduation dial 4 to monitor a specific place within the set range of angles.

A prototype of tripod has been constructed with the features of FIGS. 1~6. The tripod functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A tripod comprising a supporting base for positioning, a rotary camera platform assembly fastened pivotally with said supporting base, a driving mechanism adapted to rotate said camera platform assembly alternatively forwards and backwards on said supporting base, and a control mechanism adapted to control rotation of said camera platform assembly within a predetermined range of angles, wherein: said control mechanism comprises a graduation dial disposed at a bottom side of said camera platform assembly above said supporting base for rotary motion with said camera platform assembly relative to said supporting base, a first micro switch adapted to control said driving mechanism to rotate said camera platform assembly forwards when triggered, a second micro switch adapted to control said driving mechanism to rotate said camera platform assembly backwards when triggered, a trigger rod mounted in said supporting base between said first micro switch and said second micro switch and adapted to trigger said second micro switch during forward rotation of said graduation dial with said camera platform assembly and said first micro switch during backward rotation of said graduation dial with said camera platform assembly, and a circuit module electrically connected to said first micro switch and said second micro switch and adapted to control said driving mechanism to rotate said camera platform assembly on said supporting base forwards and backwards according to the triggering status of said first micro switch and said second micro switch.

2. The tripod as claimed in claim 1, wherein said graduation dial comprises a plurality of radial slots equiangularly spaced around the periphery thereof, and two stop rods selectively inserted into said radial slots and force said trigger rod to trigger said first micro switch and said second micro switch respectively.

3. The tripod as claimed in claim 2, where the number of said radial slots is between 18 and 36 inclusive.

4. The tripod as claimed in claim 2, wherein the number of said radial slots is 24.

* * * * *